F. MUELLER.
AUTOMOBILE POST HOLE DIGGER.
APPLICATION FILED MAR. 1, 1913.
1,108,102.
Patented Aug. 18, 1914.
5 SHEETS—SHEET 1.
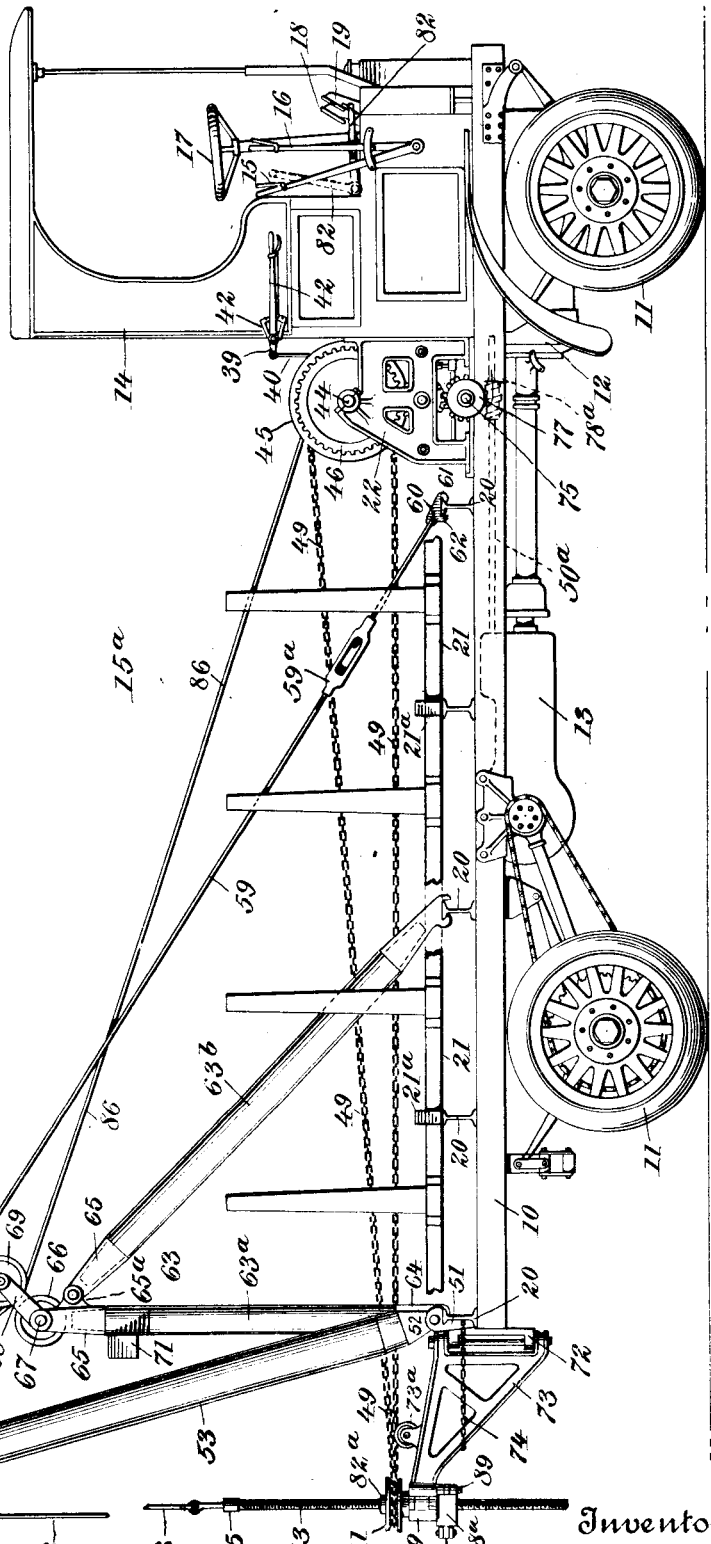
Witnesses:
Julius H. Hutz
Edwin H. Dietrich
Inventor
FRANK MUELLER
BY Conrad A. Dietrich
his ATTORNEY

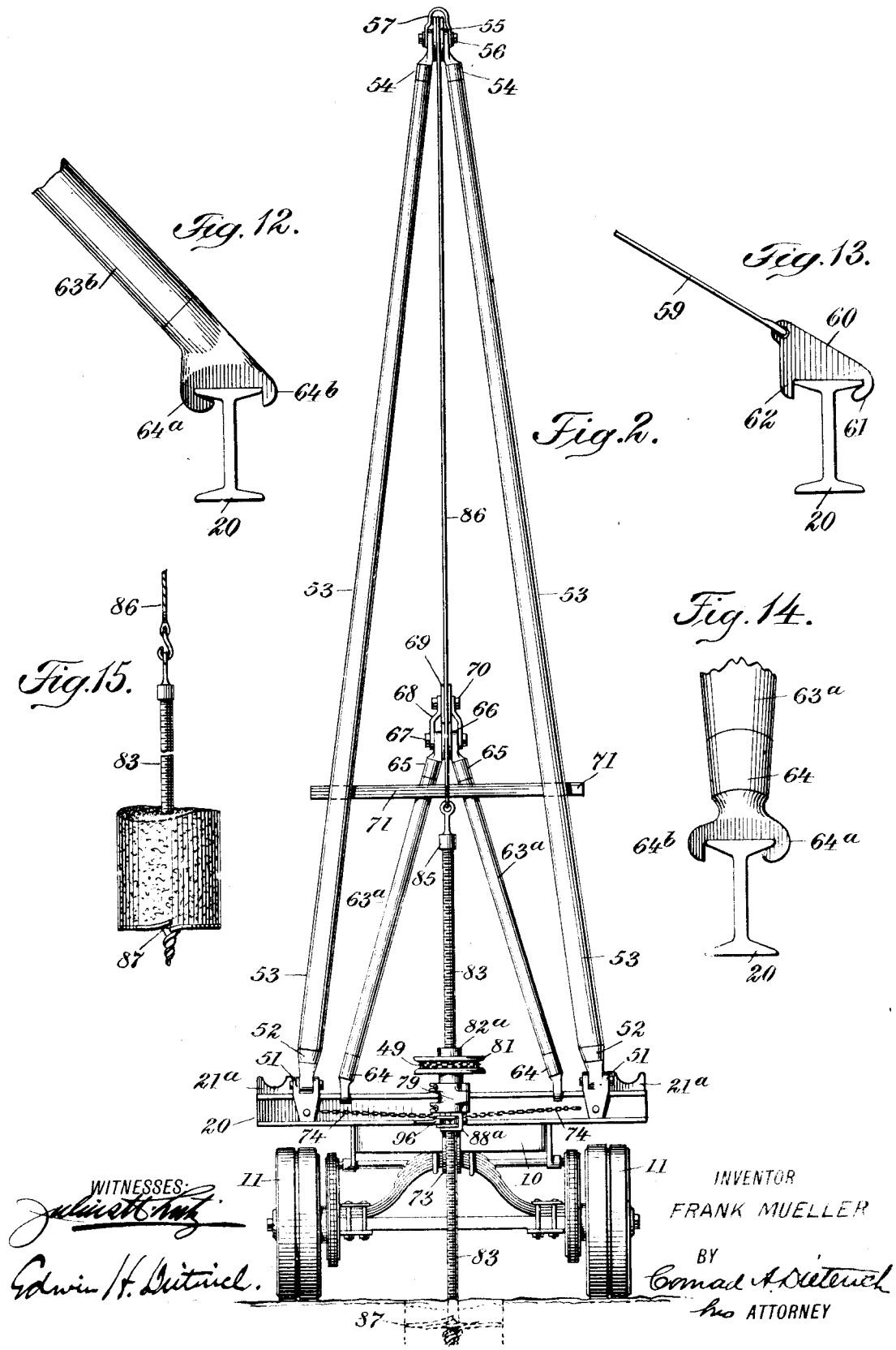

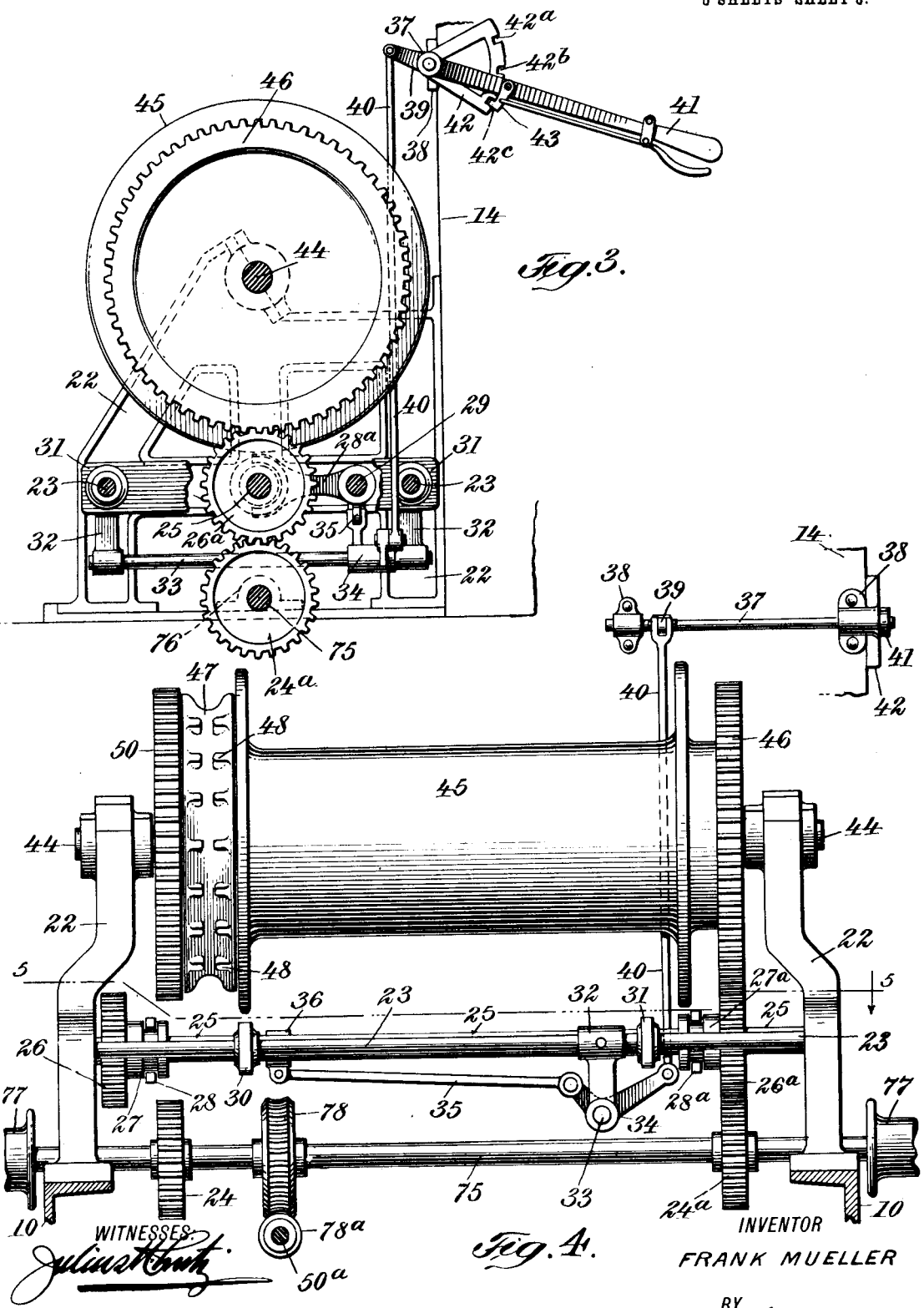

F. MUELLER.
AUTOMOBILE POST HOLE DIGGER.
APPLICATION FILED MAR. 1, 1913.
1,108,102.
Patented Aug. 18, 1914.
5 SHEETS—SHEET 4.
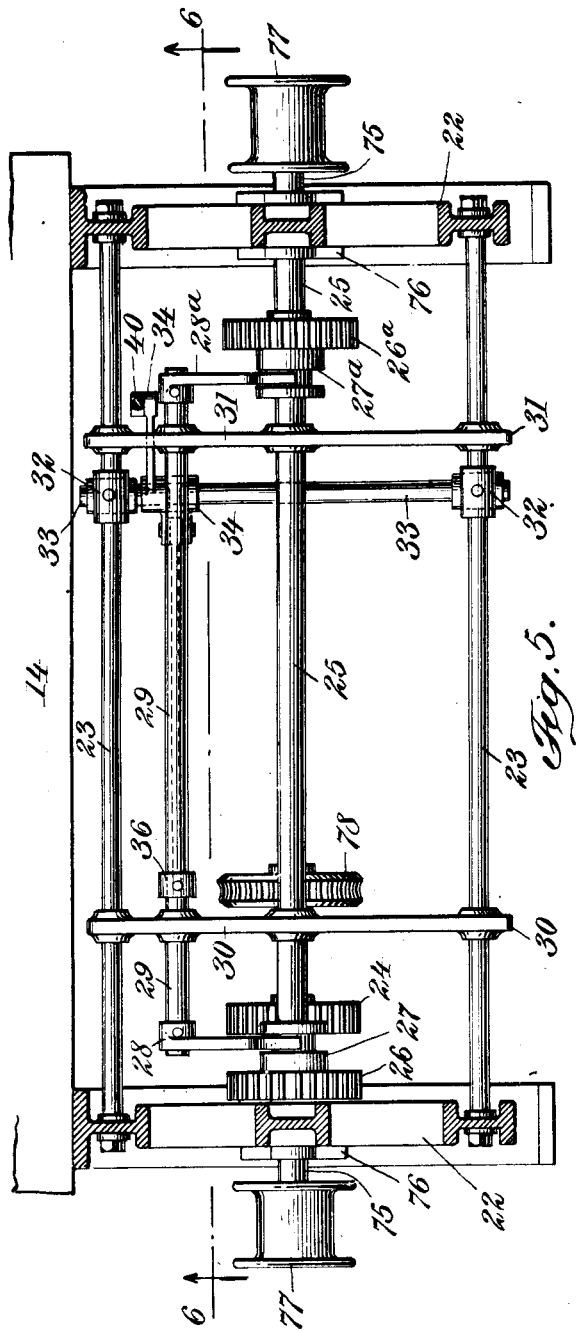
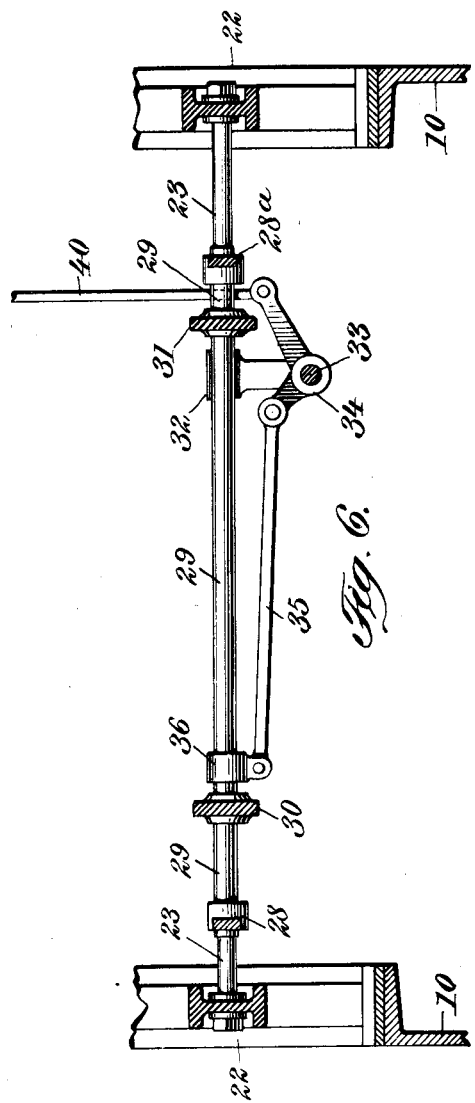
INVENTOR
FRANK MUELLER F. MUELLER.
AUTOMOBILE POST HOLE DIGGER.
APPLICATION FILED MAR. 1, 1913.
1,108,102.
Patented Aug. 18, 1914.
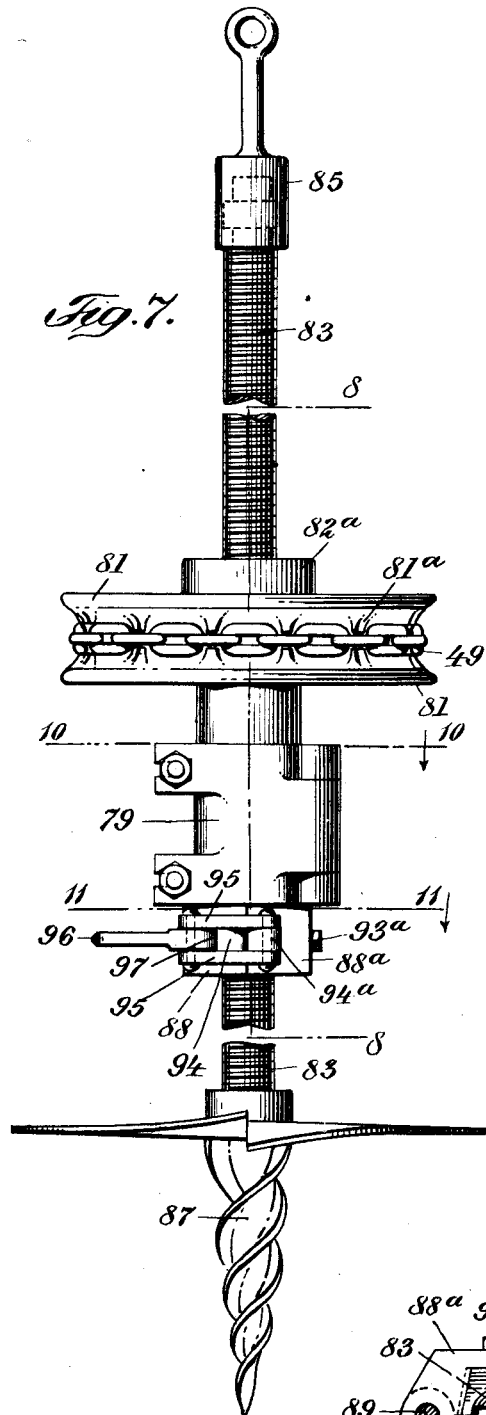
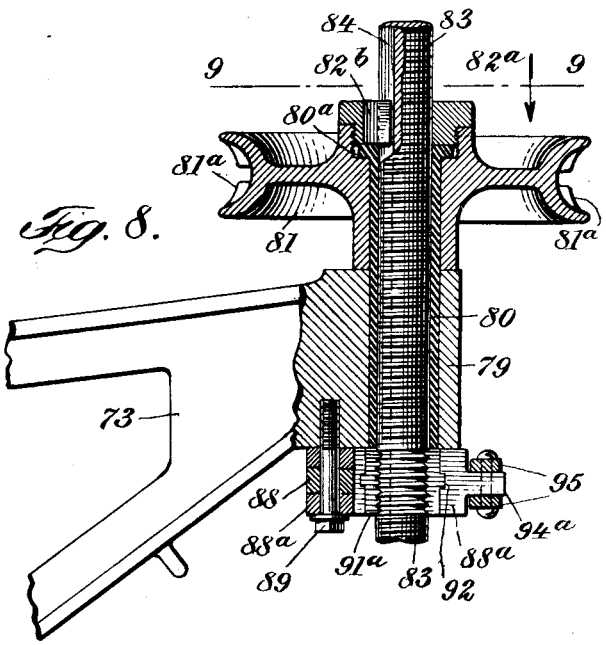
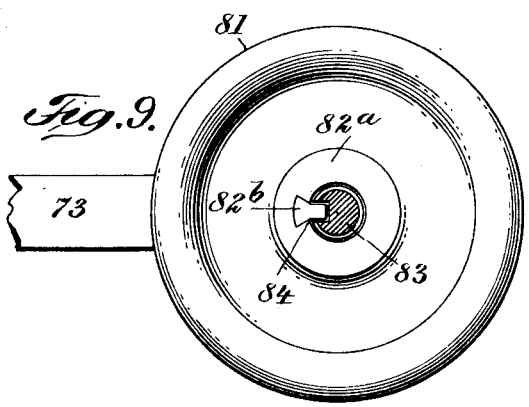
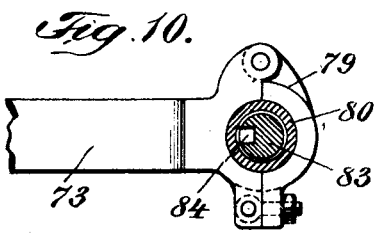
INVENTOR
FRANK MUELLER
BY
*Conrad A. Dietrich*
his ATTORNEY

UNITED STATES PATENT OFFICE.

FRANK MUELLER, OF ALLENTOWN, PENNSYLVANIA, ASSIGNOR TO INTERNATIONAL MOTOR COMPANY, OF WILMINGTON, DELAWARE, A CORPORATION OF DELAWARE.

AUTOMOBILE POST-HOLE DIGGER.

1,108,102.     Specification of Letters Patent.     Patented Aug. 18, 1914.

Application filed March 1, 1913. Serial No. 751,433.

*To all whom it may concern:*

Be it known that I, FRANK MUELLER, a citizen of the United States, residing at Allentown, Lehigh county, in the State of Pennsylvania, have invented certain new and useful Improvements in Automobile Post-Hole Diggers, of which the following is a full, clear, and exact specification.

My invention relates to improvements in motor vehicles and the same has for its object more particularly to provide a motor vehicle serving as a portable means for producing post-holes to receive poles used in connection with telephone, telegraph and trolley lines or other purposes.

Further said invention has for its object to provide an apparatus by means of which a post-hole may be easily and quickly formed in the ground by means of a suitable boring device which is adapted to be operated by the same mechanism which serves to operate the driving mechanism of the vehicle.

Further said invention has for its object to provide apparatus by means of which the boring device or auger together with its operating shaft may be raised bodily out of the hole produced by the auger when it is desired to lift out of the hole the material cut or loosened by said auger.

Other objects will in part be obvious, and in part be hereinafter described.

To the attainment of the aforesaid objects and ends, my invention consists in the novel details of construction, and in the combination, connection and arrangement of parts hereinafter more fully described and then pointed out in the claims.

In the accompanying drawings forming part of this specification wherein like numerals of reference indicate like parts Figure 1 is a side view showing one form of apparatus constructed according to, and embodying my said invention; Fig. 2 is a rear end view thereof with the parts toward the front of the vehicle omitted to avoid confusion; Fig. 3 is an enlarged end view, partly broken away showing the operating mechanism for the boring and lifting device; Fig. 4 is a front view thereof; Fig. 5 is a horizontal section thereof on the line 5—5 of Fig. 4; Fig. 6 is a detail vertical section on the line 6—6 of Fig. 5; Fig. 7 is an enlarged detail side view of the boring device and its coöperating parts; Fig. 8 is a detail central section on the line 8—8 of Fig. 7; Fig. 9 is a detail cross section on the line 9—9 of Fig. 8; Fig. 10 is a similar view on the line 10—10 of Fig. 7; Fig. 11 is a similar view on the line 11—11 of Fig. 7; Figs. 12, 13 and 14 are detail side views of the anchorages for the boom guy, tripod brace and tripod legs respectively, and Fig. 15 is a side view showing the auger with a load of material in place thereon as removed from a hole.

In said drawings 15ª designates a motor truck comprising the usual frame 10, wheels 11, motor 12 and transmission mechanism 13. At the forward end of the truck is provided a driver's cabin 14 which is arranged over the motor 12.

15 and 16 denote the transmission levers, one of which controls the low speed and reverse gears, and the other of which controls the second and high speed gears.

17 denotes the steering mechanism; 18 the clutch operating pedal and 19 the brake operating pedal.

Upon the portion of the truck frame 10 to the rear of the cabin 14 are secured a series of transverse beams 20, 20 upon which is supported the floor 21 of the truck. Certain of the forward and rear transverse beams 20, 20 are made somewhat longer than the intermediate ones in order to form projecting ends which extend beyond the edges of the flooring 21 at each of its sides. Upon the projecting ends of said beams are secured pillow blocks 21ª, 21ª which serve as supports for the two boom members when the same are not in use.

Directly behind the cabin 14 is disposed the means for operating the boring device and the means for raising the same. The said means consists of a pair of end frames 22, 22 supported upon the side frame members of the truck, and secured together by the rods 23, 23. Upon the base of said end frames 22, 22 are secured bearings 76, 76 in which is mounted a shaft 75 provided at its opposite projecting ends with drums 77, 77, and intermediate its ends with a fixed worm gear 78, meshing with a worm 78ª upon a longitudinal shaft 50ª, adapted to be operatively connected with the transmission mechanism 13 by means of the lever 82. The particular construction of the mechanism for operatively connecting the shaft 75 with the transmission mechanism 13 is fully shown in another application filed by me on October 16, 1912, Serial No. 726,028 to which reference is hereby made.

For the purposes of my present invention I apply two additional gears 24, 24ª to shaft 75 and secure the same thereon adjacent to the opposite ends of said shaft but within the end frames 22, 22. Directly above the shaft 75 is arranged a shaft 25 having its opposite ends mounted in the end frames 22, 22 and upon said shaft are fixed gears 26, 26ª adapted to mesh with the gears 24, 24ª, respectively, on the shaft 75. To facilitate the shifting of the gears 26, 26ª the same are provided, respectively, with grooved collars 27, 27ª to receive the forked ends of arms 28, 28ª fixed upon a shaft 29 which is slidably mounted in transverse supports 30, 31 having their opposite ends secured to the tie rods 23, 23.

32, 32 denote bearings suspended from the tie rods 23, 23. Within said bearings is supported a longitudinal shaft 33, to the inner end of which is fixed a bell-crank lever 34. To the shorter member of said bell-crank lever is pivotally connected one end of a link 35 whose other end is pivotally secured to a collar 36 fixed upon the shaft 29.

Upon the rear of the cabin 14 is arranged a short shaft 37 having its ends disposed in bearings 38, 38 secured to the cabin 14. Adjacent to the inner end of said shaft 37 is fixed an arm 39 to which is pivotally secured the upper end of a rod 40. The lower end of said rod is similarly secured to the longer member of the bell-crank lever 34 fixed on the shaft 33.

41 denotes an operating lever secured to the outer end of the shaft 37, and upon the outer side of the cabin 14 adjacent to the forward end of the shaft 37 is secured a segmental plate 42 having three recesses 42ª, 42ᵇ, 42ᶜ therein adapted to receive the end of a spring-actuated detent 43 carried by the operating lever 41. When the operating lever 41 is adjusted to the "neutral point," viz. with the detent 43 engaging the intermediate recess 42ᵇ, both of the gears 26, 26ª on the shaft 25 will be out of engagement with the gears 24, 24ª on the shaft 75. When the lever is adjusted to its lowermost position with the detent 43 engaging the recess 42ᶜ as shown at Fig. 1 the gears 24ª, 26ª will be in engagement, and when said operating lever 41 is adjusted to its upper position with the detent 43 engaging the recess 42ª the gears 24, and 26 will be shifted into operative engagement.

Within the upper parts of the end frames 22, 22 is supported a shaft 44 upon which is mounted a winding drum 45 having a large gear 46 secured to its right hand end (Fig. 4) meshing with the gear 26ª on the shaft 25. Upon the opposite end of the shaft 44 but within the end frames 22, 22 is loosely mounted a pulley 47 having spaced projections 48 upon its periphery adapted to receive the links of an operating chain 49 which serves as a belt to rotate the auger shaft 83. To the outer side of the pulley 47 is secured a large gear wheel 50, corresponding in size with the large gear wheel 46 on the winding drum, which gear wheel 50 is adapted to engage with the gear wheel 26 on the shaft 25.

The rear transverse beam 20 is provided adjacent to its opposite end with bearings 51, 51 within which are pivotally secured the foot pieces 52, 52 secured to the lower ends of the leg members 53, 53 which jointly constitute a boom. The upper ends of said leg members 53, 53 are provided with bearings 54, 54 intermediate of which is disposed a pulley 55 working upon a bolt 56 which also serves, in conjunction with the yoke 57, to hold the upper ends of said leg-members united. To the upper united ends of the boom members 53, 53 is secured by means of a shackle 58, one end of a guy 59 whose other end is secured to an angular foot piece 60 having a hook member 61 at its forward end and a projection 62 at its rear end embracing the opposite upper flanges of the forward transverse beam 20. The said guy 59 serves to support the boom to the position to which it may be adjusted by a turn-buckle 59ª.

63 denotes a tripod having two of its legs 63ª, 63ª disposed upon the rear transverse beam 20 intermediate the leg members 53, 53 of the boom, and their lower ends provided with foot pieces 64, 64. Each of said foot pieces is provided at its inner end with a depending hook member 64ª and at its outer end with a depending projection 64ᵇ adapted to embrace the opposite upper flanges of said rear transverse beam 20. The remaining leg 63ᵇ of said tripod, which serves to brace the legs 63ª, 63ª, is also provided at its lower end with a foot piece 64 having a hook member 64ª and a projection 64ᵇ. The legs 63ª, 63ª are provided at their upper ends with bearings 65, 65 intermediate of which is disposed a pulley 66 mounted upon a bolt 67 extending through said bearing 65, 65 and the corresponding end of links 68, 68 between whose outer ends is disposed a pulley 69 mounted upon a bolt 70. The bearings 65, 65 at the upper end of the leg members 63ª, 63ª are provided upon their rear sides with projecting lugs 65ª, 65ª between which is secured an eye provided at the upper end of the tripod leg 63ᵇ.

71 denotes a transverse arm secured to the outer sides of the leg members 63ª, 63ª directly below the bearings 65, 65 which serves as a stop to limit the upward movement of the boom, and prevent the same falling forward upon the cabin of the truck.

Upon the rear end of the truck frame 10 midway between the ends of the bearings 51, 51 is secured a vertical bearing 72 upon which is pivotally mounted the inner end of a bracket 73 provided upon the opposite sides of its free end with chains 74, 74 adapted to hook into eyes provided in the end of the truck frame whereby to maintain said bracket to its extended position as shown at Figs. 1 and 2. At the outer end of said bracket 73 is provided a vertical split bearing 79 within which is clamped a sleeve 80, serving as a shaft for a pulley wheel 81, having the lower edge of its hub bearing upon the upper edge of said vertical bearing 72. The upper end of the hub of said pulley wheel 81 is recessed to receive the flange 80ª of the sleeve 80, and has the inner vertical side of its recessed portion screw-threaded to receive a head 82ª having a key 82ᵇ therein. The pulley wheel 81 is provided upon its concaved surface with spaced projections 81ª adapted to receive the links of the chain belt 49 which passes over a roller 73ª on the bracket 73, and over the pulley wheel 47 mounted upon the hoisting drum shaft 44.

83 denotes a screw-threaded shaft which is free to move vertically within the sleeve 80 but revoluble with the pulley wheel 81 owing to the engagement of the key 82ᵇ in the head 82ª with the longitudinal slot 84 provided in said shaft 83. To the upper end of said shaft 83 is secured a swivel head 85 to which is secured one end of a cable 86 whose other end is passed over the pulley 55 on the boom members 53, 53; then under the pulley 69 on the tripod 63, and secured to the winding drum 45. To the lower end of said shaft 83 is secured a spiral bit or auger 87. In order to cause the shaft 83 and the bit or auger 87 carried thereon to work up or down while rotating a pair of jaws 88, 88ª are pivotally secured to the under side of the vertical bearing 72 upon a bolt 89. The inner sides of said jaws are cut out and provided with recesses 90, 90ª, and within the recessed portions of said jaws is disposed a nut comprising two correspondingly-shaped members 91, 91ª which are provided upon their outer sides with ribs 92, adapted to enter the recesses 90, 90ª. In order to maintain said nut member 91, 91ª duly within their jaw members the same are secured by screws 93, 93ª which extend through the sides of said jaws and into the nut members disposed therein. To facilitate the raising of the shaft 83 and bit or auger 87 when it is desired to lift from the hole the material which has been cut by said bit or auger the jaws 88, 88ª are provided at their free ends with laterally projecting lugs 94, 94ª, respectively. The lug 94 is somewhat larger than the lug 94ª to which latter are pivotally secured the ends of links 95, 95 within the outer ends of which is secured a locking lever 96. The lever 96 is provided at its inner end with a cam projection 97 which is adapted to engage with the outer surface of the lug 94 to hold the jaws 88, 88ª locked together and maintain the nut therein in operative connection with the screw-shaft 83.

The operation of the apparatus is as follows: The boom members 53 when not in use are carried upon pillow blocks 21ª, 21ª arranged upon the sides of the truck, and the tripod members 63ª, 63ᵇ, when dismounted, may also be carried upon the truck. The auger shaft 83 may also be carried upon the truck and the bracket 73 is normally thrown back against the rear end of the truck frame 10 and secured by one of the chains 74. When it is desired to set the apparatus in operation the lower ends of the boom members 53, 53 are first secured within the bearings 51, 51 provided at the rear end of the truck frame 10. Hereupon the upper ends of the boom members 53, 53 are secured together by means of the yoke 57 and bolt 56 with the pulley 55 in position therebetween. The hoisting cable 86 is then passed over the pulley 55 and the end thereof secured to one of the boom members 53. Hereupon the boom members 53, 53 are raised to the position indicated at Fig. 1 by means of the hoisting mechanism arranged directly behind the cabin 14. In order to operate the hoisting mechanism the lever 82 is first adjusted to the horizontal position, as indicated in Fig. 1, in order to render the transmission lever 16 inoperative, and at the same time operatively connect the shaft 50ª, which actuates the hoisting mechanism, with the transmission mechanism 13. Hereupon the transmission lever 15 is drawn rearwardly, as indicated in Fig. 1, whereupon the hoisting drum 45 will be caused to rotate through the medium of the gear 78, shaft 75, gears 24ª, 26ª and 46, and wind up the cable 86. As soon as the boom members 53, 53 have been raised to the position indicated in Fig. 1 the foot piece 60 at the end of the guy 59 is secured to the forward transverse beam 20, and the guy adjusted in position by the turnbuckle 59ª. Hereupon the outer end of the cable 86 is disconnected from the boom and secured to the swivel 86 at the upper end of the threaded auger shaft 83, and said shaft 83 then raised to its uppermost position by the cable 86 and winding drum 85 by the mechanism heretofore described. Hereupon the bracket 73 is adjusted to its extended position, as shown at Figs. 1 and 2, and secured to such position by the chains 74, 74. The shaft 83 with its sleeve 80, and pulley 81 are then clamped within the split bearing 79. In order to operatively connect the said shaft 83 with the nut members 91 91ª, the lugs 94, 94ª are released of their engagement with the cam 97 on the lever 96 and the jaws are thereupon thrown apart. After the screw has been adjusted to the described height the jaws 88, 88ª are again brought together and secured to such position by the lever 96, and the cam 97 thereon brought into engagement with the lug 94.

In order to rotate the shaft 83 the pulley 47 upon the winding drum shaft 48 is placed in rotation by means of the large gear wheel 50 which has been operatively connected with the gear 24 of the shaft 75 through the slidable gear 26 arranged upon the shaft 25. The adjusting of said gear 24 is attained by means of the lever 42 arranged upon the outer side of the cabin 14. By raising the lever 42 to its uppermost position and causing the detent 43 to engage with the recess 42ª in the segment 42 the link 40 will cause the lower end of the bell-crank lever 34 to be depressed and its shorter end drawn toward the right (see Fig. 4), and in so doing move the shaft 29 through the medium of the link 35 and collar 36 thereon. When the shaft 29 is thus moved to the right (Fig. 4) the gear 26 will be caused to engage with the gears 24 and 50, and rotation will thereupon be communicated from the worm shaft 50ª to the worm 78ª, worm gear 78 and shaft 75. As the gear 26 is moved into engagement with the gears 24 and 50 the corresponding gear 26ª at the opposite end of the shaft 25 will be moved out of engagement with its gear 24ª on the shaft 75, and the gear 46 on the winding drum shaft 44. It will be understood, of course, that the pulley wheel 47 and the gears 50, 26 and 24, and shaft 75 and connected parts are adapted to impart rotation to the auger shaft 83 only, and that when it is desired to raise said shaft 83 with its auger 87, the gear 26 is shifted out of its engagement with the gears 24 and 50, and the gear 26ª shifted into engagement with the gears 24ª and 46, and the winding drum set in operation, whereupon the cable 86 in being thus wound up will raise the shaft 83 and auger 87 out of the hole. In order to permit of the shaft 83 being thus raised it will, of course, be necessary to release the lever 96 and then open the jaws 88, 88ª. When the borer shaft 83 is thus raised any matter which has been removed or cut away by the auger 87 will be supported upon the spiral disk portion thereof as shown at Fig. 15, and in that way may be removed bodily from the opening or hole produced by the auger and then moved aside while suspended from the boom and discharged. After the hole has been dug to the required depth the outer end of the cable 86 may be disconnected from the swivel 85 arranged at the upper end of the screw shaft 83, and one of the chains 74 is released to permit of the bracket 73 being swung aside and against the rear end of the truck frame. Hereupon the outer end of the cable 86 may be attached to the pole to be set, and the winding drum 45 put in operation in the manner heretofore described, whereupon the cable 86 will be wound up thereon, and in so doing raise the pole to the required height to permit of its lower end being inserted into and lowered within the opening prepared by the auger.

It is to be noted particularly that the hoisting drum, boom and related operating parts while primarily designed as a means for supporting the auger shaft and auger, and for raising the same bodily in order to remove from the produced hole the material cut or loosened by said auger, and then again lowering said shaft and auger into the hole in order to continue the boring operation, may nevertheless be utilized without change or modification as a derrick or hoisting apparatus for raising and setting a pole in position within the hole, and for supporting the pole while the earth and material is being filled in around the same.

Having thus described my said invention, what I claim and desire to secure by Letters Patent is:—

1. The combination with a motor vehicle and the driving mechanism thereof, of an auger, means for supporting said auger, means for operating said auger, and means for simultaneously rendering said driving mechanism inoperative as to the vehicle and operatively connecting said driving mechanism with said auger operating means, substantially as specified.

2. The combination with a motor vehicle and the driving mechanism thereof, of a shaft, a transmission mechanism intermediate said driving mechanism and said shaft, an auger carried by said shaft, a bearing for supporting said shaft, a pulley on said shaft, a driving pulley, a belt connecting said first-named pulley with said driving pulley, and means for simultaneously rendering said driving mechanism inoperative as to said vehicle, and operatively connecting said driving pulley with said driving mechanism to operate said auger, substantially as specified.

3. The combination with a motor vehicle and the driving mechanism, of a shaft, a transmission mechanism intermediate said driving mechanism and said shaft, an auger carried by said shaft, a bearing for vertically supporting said shaft, a pulley on said shaft, a driving pulley, a belt connecting said first-named pulley with said driving pulley means for raising said shaft and auger to remove the material loosened by said auger, and means for simultaneously rendering said driving mechanism inoperative as to said vehicle and operatively connecting the same with said auger shaft and said means for raising said auger shaft, substantially as specified.

4. The combination with a motor vehicle and the driving mechanism thereof, of a shaft, an auger carried by said shaft, a bearing at the end of said vehicle for vertically supporting said shaft, a pulley on said shaft, a transmission mechanism, a driving pulley, and a winding drum supported intermediate said first-named shaft and said driving mechanism, a flexible member connecting said driving pulley with the pulley on said first-named shaft, a support on the vehicle, a cable having one end secured to said first-named shaft and its other end passed over said support and secured to said winding drum, and means for rendering said driving mechanism inoperative as to said vehicle, and operatively connecting the same with said driving pulley or with said driving drum, substantially as specified.

5. The combination with a motor vehicle and the driving mechanism thereof, of a shaft, an auger carried by said shaft, a bearing at the end of said vehicle for vertically supporting said shaft, a pulley on said shaft, means for feeding said shaft to advance said auger, a shaft supported intermediate said first-named shaft and said driving mechanism, a driving pulley and a winding drum mounted upon said shaft, a flexible member connecting said driving pulley with the pulley on said first-named shaft, a support on the vehicle, a cable having one end secured to said first-named shaft, and its other end passed over said support and secured to said winding drum, and means for connecting, at will, the driving mechanism of the vehicle with said driving pulley and said winding drum, substantially as specified.

6. The combination with a motor vehicle and driving mechanism thereof, of a screw shaft, an auger carried by said shaft, a bearing secured to said vehicle for vertically guiding said shaft, a pulley slidably keyed to said screw shaft, a nut on said bearing adapted to engage said shaft to feed the same, an adjustable support arranged upon said vehicle adjacent to said bearing, means for securing said support to its adjusted position, an operating mechanism interposed between said screw shaft and said driving mechanism of the vehicle, a flexible member connecting one part of said operating mechanism with the pulley on said screw shaft, a flexible member having one end secured to the upper end of said screw shaft and its other end passed over said adjustable support and secured to another part of said operating mechanism, and means for connecting, at will, either part of said operating mechanism with the driving mechanism of the vehicle, substantially as specified.

7. The combination with a motor vehicle and driving mechanism thereof, of a bracket pivotally mounted upon one end of the vehicle, means for securing said bracket to its adjusted position, a vertical bearing secured to the free end of said bracket comprising a fixed and a movable part, a screw shaft disposed within said bearing, an auger carried at the lower end of said screw shaft, a pulley slidably arranged upon said screw shaft, a pair of pivoted jaws secured to said bearing, nut members secured therein, means for securing said jaws together and the nut members therein in engagement with said screw shaft, an adjustable support arranged upon the vehicle adjacent to said bracket, a roller on said support, means for securing said support, a shaft mounted upon the vehicle intermediate its driving mechanism and said screw shaft, a driving pulley and a winding drum on said shaft, a belt connecting said driving pulley with the pulley on said screw shaft, a flexible member having one end secured to said drum and its other end passed over the roller on said support and secured to the other end of said screw shaft, and means for connecting, at will, said driving pulley and said winding drum with the driving mechanism of the vehicle, substantially as specified.

8. The combination with a motor vehicle and driving mechanism thereof, of a bracket pivotally mounted upon the rear end of the vehicle, means for securing said bracket in position thereon, a tubular member at the free end of said bracket comprising a fixed part and a movable part, means for securing said parts together, a sleeve member secured within said tubular member, a screw shaft disposed within said sleeve member, an auger carried at the lower end of said screw shaft, a pulley mounted upon said screw shaft and in sliding engagement therewith, a pair of pivoted jaws secured to said tubular member, a pair of nut members secured therein, means for clamping said jaws together and the nut members therein in operative engagement with said screw shaft, a tripod mounted upon the vehicle, a pivoted support arranged upon the vehicle adjacent to said tripod, a roller mounted on said pivoted support, means for securing said support in position, a shaft mounted upon the vehicle intermediate its driving mechanism and said screw shaft, a driving pulley and a winding drum mounted on said shaft, gear wheels secured to said driving pulley and winding drum, a belt connecting said driving pulley with the pulley on said screw shaft, a flexible member having one end secured to said winding drum and its other end passed over the roller on said pivoted support and secured to the upper end of said screw shaft, a train of gearing arranged intermediate the gears secured to said driving pulley and said winding drum, and means operable from the driver's seat for placing at will, either the gear wheel on said driving pulley or the gear wheel on said winding drum in mesh with said train of gearing whereby to rotate said screw shaft and auger and to raise the same bodily together with the material removed by said auger, substantially as specified.

9. In an apparatus of the character described the combination with a driving mechanism, of a driving shaft adapted for connection with said driving mechanism, a pair of gears fixed on said driving shaft, a second shaft, a winding drum mounted thereon, a gear revoluble with said winding drum, a driving pulley also mounted upon said second shaft, a gear revoluble with said pulley, an intermediate shaft, a pair of gears loosely mounted thereon; one of said gears being adapted to mesh with the gear of said winding drum and one of the gears on said driving shaft, and the other of said gears adapted to mesh with the gear of said driving pulley and the other gear on said driving shaft, and means for shifting either of the gears on said intermediate shaft into operative relation with the gears coöperating therewith, substantially as specified.

10. In an apparatus of the character described, the combination with a driving mechanism, of a driving shaft adapted for connection with said driving mechanism, a pair of gears fixed on said driving shaft, a second shaft, a winding drum mounted thereon, a gear revoluble with said winding drum, a driving pulley also mounted upon said second shaft, and a gear revoluble with said pulley, an intermediate shaft, a pair of gears mounted thereon; one of said gears being adapted to mesh with the gear of said winding drum and one of the gears on said driving shaft, and the other of said gears adapted to mesh with the gear of said driving pulley and the other gear on said driving shaft, a lever pivotally supported, means connecting said lever with the gears upon said intermediate shaft whereby to shift one of said gears into engagement with its coöperating gears as the other of said gears is moved out of engagement with its coöperating gears, substantially as specified.

11. In an apparatus of the character described the combination with a driving mechanism of a frame, a driving shaft mounted in said frame, a pair of gears fixed on said driving shaft, a second shaft mounted above said first-named shaft, a winding drum mounted upon said second shaft, a gear fixed to and revoluble with said winding drum, a driving pulley also mounted upon said second shaft, a gear fixed to and revoluble with said pulley, a shaft supported intermediate said first and second-named shafts, a pair of gears slidably mounted upon said intermediate shaft, a shifting device supported adjacent to said intermediate shaft and engaging the slidable gears thereon, an operating lever mounted upon the vehicle, means connecting one end of said lever with said shifting device for shifting one of the gears upon said intermediate shaft into engagement with the gear on said winding drum and one of the gears on said driving shaft as the other of the gears on said shaft is moved out of engagement with the gear of the driving pulley and the other of the gears on said driving shaft, substantially as specified.

12. In an apparatus of the character described, the combination with a driving mechanism, of a frame, a driving shaft mounted in said frame, a pair of gears fixed upon said driving shaft, a second shaft mounted above said first-named shaft, a winding drum mounted upon said second shaft, a gear connected to and revoluble with said winding drum, a driving pulley also mounted upon said second shaft, a gear wheel revoluble with said pulley, a shaft supported intermediate said first and second-named shafts, a pair of gears slidably arranged upon said intermediate shaft adapted to mesh with the gears on said driving shaft and the gears on said winding drum and said driving pulley, a shifting rod supported adjacent to said intermediate shaft, members on said shifting rod loosely engaging the slidable gears on said intermediate shaft, a transverse shaft, a bell-crank lever mounted thereon, a link connecting one end of said bell-crank lever with said shifting rod, an operating lever, a link connecting said operating lever with the other end of said bell-crank lever for actuating said shifting rod to shift one of the gears on said intermediate shaft into engagement with its coöperating gears as the other of said gears is shifted out of engagement with its coöperating gears, and means for securing said operating lever to its several adjusted positions, substantially as specified.

Signed at the city of New York, in the county and State of New York, this eleventh day of February, one thousand nine hundred and thirteen.

FRANK MUELLER.

Witnesses:
CONRAD A. DIETERICH,
JOSEPH G. QUINN, Jr.